United States Patent [19]

Brehm et al.

[11] Patent Number: 5,703,986
[45] Date of Patent: Dec. 30, 1997

[54] MONOMODE OPTICAL FIBER

[75] Inventors: Claude Brehm, Montrouge; Jean-Yves Boniort, Limours; Pascale Nouchi, Villebon Sur Yvette; Jacques Auge, Saint Cheron, all of France

[73] Assignee: Alcatel N.V., Rijswijk, Netherlands

[21] Appl. No.: 687,370

[22] PCT Filed: Dec. 21, 1995

[86] PCT No.: PCT/FR95/01711

§ 371 Date: Aug. 2, 1996

§ 102(e) Date: Aug. 2, 1996

[87] PCT Pub. No.: WO96/20420

PCT Pub. Date: Jul. 4, 1996

[30] Foreign Application Priority Data

Dec. 23, 1994 [FR] France ................... 94 15554

[51] Int. Cl.$^6$ ............................................. G02B 6/02
[52] U.S. Cl. ....................... 385/123; 385/124; 385/127; 385/128
[58] Field of Search ............................ 385/123–124, 385/126–128

[56] References Cited

U.S. PATENT DOCUMENTS

| | | | |
|---|---|---|---|
| 4,089,586 | 5/1978 | French et al. | 385/123 |
| 4,402,570 | 9/1983 | Chang | 385/123 |
| 4,755,022 | 7/1988 | Ohashi et al. | 385/124 |
| 4,838,643 | 6/1989 | Hodges et al. | 385/127 |

FOREIGN PATENT DOCUMENTS

0260795A3  3/1988  European Pat. Off. .

OTHER PUBLICATIONS

*Patent Abstracts of Japan*, vol. 014, No. 094 (P–1010) Feb. 21, 1990 corresponding to JP A 01 302233 dated Dec. 6, 1989.

*Patent Abstracts of Japan*, vol. 009, No. 327 9P–415) Dec. 21, 1985 corresponding to JP A 60 153004 dated Aug. 12, 1985.

*Patent Abstracts of Japan*, vol. 012, No. 154 9P–700) dated May 12, 1988 corresponding to JP A 62 269902 dated Nov. 24, 1987.

*Primary Examiner*—Rodney B. Bovernick
*Assistant Examiner*—Hemang Sanghavi
*Attorney, Agent, or Firm*—Sughrue, Mion, Zinn, Macpeak & Seas, PLLC

[57] ABSTRACT

The present invention concerns a monomode optical fiber comprising an optical core for guiding the majority of light waves, surrounded by an optical sheath, the difference between the maximum refraction coefficient of the core and that of the optical sheath being indicated as Δn and the radius of the core being indicated as a, characterized in that:

a ∈ [0.6$a_c$ : 1.1$a_c$], $a_c$ being provided, in μm, by the formula:

$$a_c = \frac{2.405}{k} \times \frac{1}{\sqrt{2n_g \Delta n}}$$

where k=2π/λ, λ being (in μm) the wavelength of the transmission, and where $n_g$ is the coefficient of said optical sheath, equal within 10$^{-3}$ to that of pure silica, Δn is greater than or equal to 0.01, and in that, φ being the diameter of said optical sheath, in μm: φ ∈ [φ$_{min}$ : 100], φ$_{min}$ being provided, in μm, by the formula:

$$\phi_{min} = 125 \times \left(\frac{10^{-12}}{2.4 n_g K^2}\right)^{1/8} \frac{[V(0.5862 + 1.8364 V^{-3/2} + 3.712 V^{-6})]^{1/4}}{(1.1428 - 0.996 V^{-1}) \Delta n^{5/8}}$$

where $$V = \frac{2\pi a}{\lambda} \sqrt{2n_g \Delta n} \ .$$

4 Claims, 1 Drawing Sheet

MONOMODE OPTICAL FIBER

BACKGROUND OF THE INVENTION

The present invention concerns a monomode optical fiber.

An optical fiber is an optical waveguide consisting of a central part, referred to as an optical core, whose purpose is to guide the majority of the light waves, surrounded by a peripheral part, referred to as an optical sheath. In general, the optical sheath is surrounded by a protective covering made of synthetic material (a resin, for example) with a thickness of approximately 50 μm.

The transmission wavelength currently chosen for optical fibers is 1.3 or 1.55 μm. Indeed, it is at such wavelengths that it is possible to obtain a minimum attenuation in the transmission of light, inferior to 0.4 dB/km.

Thus, within the scope of the present invention, the fibers considered are intended to be used at a wavelength of 1.3 or 1.55 μm, the most efficient for transmission.

Furthermore, it is well known that monomode optical fibers have a much larger bandwidth than multimode fibers, and it is for this reason that current and future developments in the field of optical fibers are focused on monomode optical fibers.

As a result, the present invention is particularly related to monomode optical fibers intended to be used at a wavelength of 1.3 or 1.55 μm.

The monomode optical fibers currently used have a core diameter which varies from 8 to 10 μm; the diameter of their optical sheath is 125 μm, identical to that of multimode optical fibers. Because of the relatively significant diameter of the assembly made up of the optical core and sheath, the cost in silica to achieve the preform from which a standard monomode optical fiber is drawn is high. To reduce this cost, it has already been suggested to reduce the diameter of the core to approximately 2.5 to 3 μm, while maintaining the diameter of the sheath at 125 μm.

However, such a reduction in the diameter of the core does not lead to a sufficient reduction in cost.

Furthermore, since the diameter of the optical sheath remains unchanged, the transmission capacity of a fiber-optical cable containing such fibers is not increased.

SUMMARY OF THE INVENTION

One goal of the present invention is further to achieve a monomode optical fiber having a manufacturing cost inferior to that of known monomode optical fibers.

Another goal of the present invention is to decrease the dimensions of the monomode optical fibers so as to increase the capacity of fiber-optical cables.

For this purpose, the present invention proposes a monomode optical fiber comprising an optical core for guiding the majority of light waves, surrounded by an optical sheath, the difference between the maximum refraction coefficient of said core and that of said optical sheath being indicated as $\Delta n$ and the radius of said core being indicated as a, characterized in that:

$a \in [0.6a_c; 1.1a_c]$, $a_c$ being provided, in μm, by the formula:

$$a_c = \frac{2.405}{k} \times \frac{1}{\sqrt{2n_g \Delta n}}$$

where $k=2\pi/\lambda$, $\lambda$ being (in μm) the wavelength of the transmission, and where $n_g$ is the coefficient of said optical sheath, equal within $3 \times 10^{-3}$ to that of pure silica, $\Delta n$ is greater than or equal to 0.01, and in that, $\phi$ being the diameter of said optical sheath, in μm: $\phi \in [\phi_{min}; 100]$, $\phi_{min}$ being provided, in μm, by the formula:

$$\phi_{min} = 125 \times \left( \frac{10^{-12}}{2.4 n_g K^2} \right)^{1/8} \frac{[V(0.5862 + 1.8364V^{-3/2} + 3.712V^{-6})]^{1/4}}{(1.1428 - 0.996V^{-1})\Delta n^{5/8}}$$

where $$V = \frac{2\pi a}{\lambda} \sqrt{2n_g \Delta n} \ .$$

By choosing the characteristic parameters of the optical fiber, i.e. a, $\Delta n$ and $\phi$, in the manner indicated above, it is possible to achieve a monomode optical fiber with transmission wavelengths approaching 1.3 or 1.55 μm, which has a reduced sheath diameter with respect to the fibers of prior art, while displaying an attenuation and a sensitivity to microcurvatures comparable to those of standard fibers.

It can therefore be observed that, according to the invention, it is not necessary for a monomode optical fiber to have an optical sheath with a diameter in the order of 125 μm. Such a diameter was chosen for the original design of monomode fibers in order to obtain monomode and multimode fibers with the same dimensions (for multimode fibers, which have a core diameter of up to 85 μm, the diameter of the optical sheath is close to 125 μm so as to obtain the guidance required while preserving the flexibility of the fiber).

The invention thus makes it possible to reduce, without adversely affecting the transmission performances, the overall dimensions of the optical fiber and, as a result, to increase the capacity of the fiber-optical cables while reducing the cost of achieving optical fibers.

The coefficient profile of an optical fiber according to the invention can be chosen from amongst the step-type profiles, trapezoid or triangle, as long as the conditions for a, $\Delta n$ and $\phi$ according to the invention are observed.

Further characteristics and advantages of the present invention will be understood upon reading the description and examples which follow of optical fibers according to the invention, provided on an illustrative and by no means limiting basis.

BRIEF DESCRIPTION OF THE DRAWINGS

FIG. 5 shows $\phi_{min}$ as a function of $\Delta n$ and a.

DETAILED DESCRIPTION OF THE INVENTION

Figure 1:
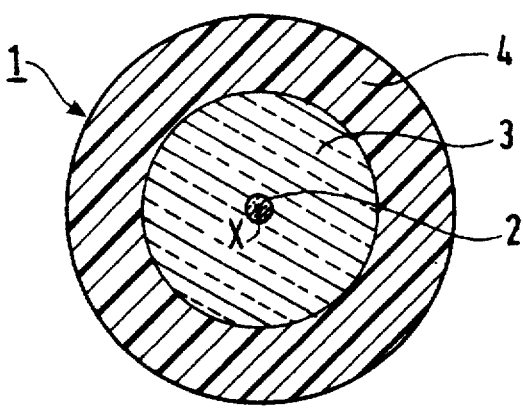
FIG. 1 is a cross-section of an optical fiber according to the invention.

In all these figures, the elements in common are indicated by the same reference numerals.

FIG. 1 thus shows an optical fiber 1 according to the invention comprising an optical core 2 made of a silica base material, for example, doped with germanium to increase its refraction coefficient with respect to that of pure silica, centrally located along the longitudinal axis X of the fiber 1, surrounded by an optical sheath 3, made of substantially pure silica, i.e. with a refraction coefficient equal to that of pure silica or inferior to it by $10^{-3}$ or more (the coefficient of the optical sheath 3 can vary between the periphery of the core 2 and the exterior of the fiber 1, while remaining inferior to that of the core 2). The optical sheath 3 is surrounded by a protective covering 4 made of plastic material, such as a resin for example.

Figure 2:
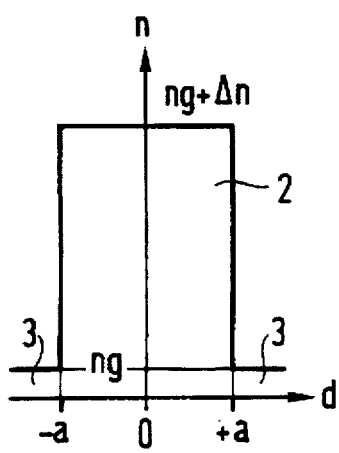
FIG. 2 shows the coefficient profile of the fiber of FIG. 1.

FIG. 2 shows the coefficient profile of the fiber of FIG. 1, i.e. it shows, as a function of the distance d from the axis X of the optical fiber, the variations of the refraction coefficient n in the core 2 and in the optical sheath 3 of the optical fiber 1 within a cross-section of the fiber 1. The profile shown in FIG. 2 is of the type referred to as in steps: the maximum coefficient of the core 2 being indicated as $n_g+\Delta n$, the coefficient of the core 2 varies between $n_g$ and $n_g+\Delta n$ so as to give the curve a rectangular shape; the sheath 3 has a substantially constant coefficient $n_g$. As mentioned above, the coefficient $n_g$ typically neighbours that of pure silica, so that it is inferior to the latter (equal to 1.444) by a difference of 0.001 at most.

Figure 3:
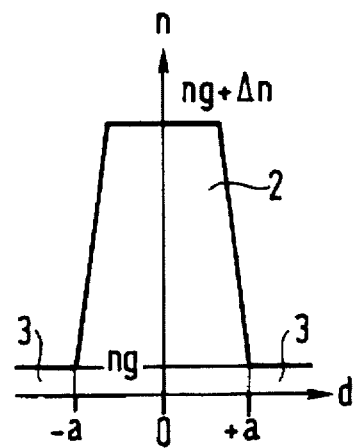
FIG. 3 shows a trapezoid-type coefficient profile.
Figure 4:
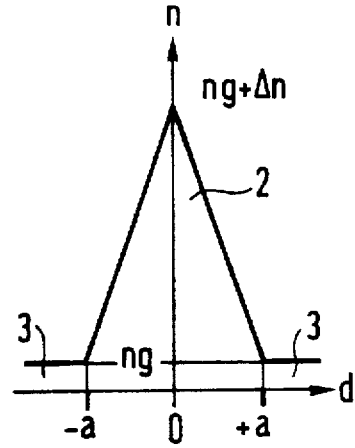
FIG. 4 shows a triangle-type coefficient profile.

FIGS. 3 and 4 show two other types of profiles which can be displayed by the fiber 1, these being a trapezoid-type profile (the coefficient of the core 2 varies between $n_g$ and $n_g+\Delta n$ so as to give the curve a trapezoid shape, and the sheath 3 has a substantially constant coefficient $n_g$) and a triangle-type profile (the coefficient of the core 2 varies between $n_g$ and $n_g+\Delta n$ so as to give the curve a triangular shape, and the sheath 3 has a substantially constant coefficient $n_g$), respectively.

In a general manner, the triangle and step-type profiles are considered, within the scope of the present invention, as particular cases of a trapezoid-type profile in which the ratio between the smaller base and the larger base is equal to 1 or 0, respectively.

According to the invention, the outer diameter $\phi$ (in μm) of the optical sheath can be chosen so that $\phi \in [\phi_{min}, 100]$, $\phi_{min}$ being provided, in μm, by the formula:

$$\phi_{min} = 125 \times \left(\frac{10^{-12}}{2.4 n_g K^2}\right)^{1/8} \frac{[V(0.5862 + 1.8364V^{-3/2} + 3.712V^{-6})]^{1/4}}{(1.1428 - 0.996V^{-1})\Delta n^{5/8}}$$

where $$k = 2\pi/\lambda$$

$$V = \frac{2\pi a}{\lambda} \sqrt{2n_g \Delta n}$$

$\lambda$ being (in μm) the wavelength of the transmission (1.3 or 1.55 μm), and a being the radius of the core of the optical fiber.

When, according to the invention, $\phi$ is chosen within the interval $[\phi_{min}, 100]$, i.e. so as to reduce losses due to curvatures or microcurvatures, $\Delta n$ being chosen superior to 0.01 and a (in μm) within the interval $[a_c : 1.1 a_c]$ ($a_c$ being provided, in μm, by the formula:

$$a_c = \frac{2.405}{k} \times \frac{1}{\sqrt{2n_g \Delta n}},$$

so as to maintain within the optical fiber an attenuation inferior to 0.4 dB/km and preserve a cut-off wavelength strictly inferior to the wavelength of the transmission (1.3 or 1.55 μm), it is possible to bring the diameter of the optical sheath well below 125 μm (conventional value for standard monomode fibers), which makes it possible to achieve significant savings in the manufacturing cost of optical fibers, as well as to increase the capacity of the fiber-optical cables.

For example, when $\phi$ is chosen equal to 100 μm, with all the other elements unchanged with respect to those in a standard monomode optical fiber, the reduction in the dimensions of the optical fiber obtained is close to 33%; when $\phi$ is chosen equal to 80 μm, with all the other elements unchanged with respect to those in a standard monomode optical fiber, the reduction in the dimensions of the optical fiber obtained is close to 60%. As a first approximation, the reduction in the manufacturing cost of the fiber is substantially equal to the reduction in cross-section, i.e. to the reduction in dimensions.

Figure 5:
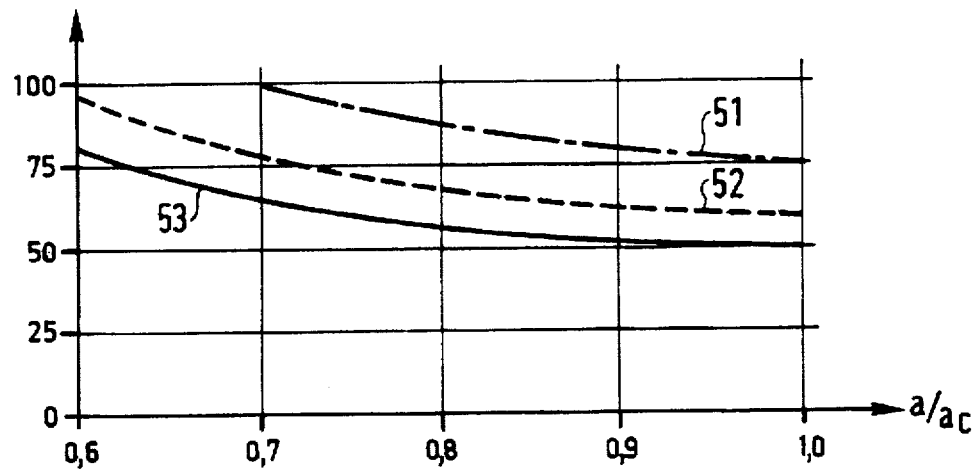

FIG. 5 shows a monomode fiber intended to operate at 1.55 μm, several curves providing the minimum diameter of the optical sheath $\phi_{min}$ for different values of the ratio $a/a_c$, as well as for different values of $\Delta n$.

The curve 51 corresponds to the case where $\Delta n$ is equal to 0.01; it can be seen that $\phi_{min}$ can be chosen from between 75 μm and 100 μm, according to $a/a_c$.

The curve 52 corresponds to the case where $\Delta n$ is equal to 0.015; it can be seen that $\phi_{min}$ can be chosen from between 62.5 μm and 100 μm, according to $a/a_c$.

The curve 53 corresponds to the case where $\Delta n$ is equal to 0.012; it can be seen that $\phi_{min}$ can be chosen from between 50 μm and 75 μm, according to $a/a_c$.

The criteria according to the invention with respect to a, $\Delta n$ and $\phi$ apply in a general manner to all optical fibers having a trapezoid-type profile (including the optical fibers having a triangle or step-type profile).

As for the synthetic protective coating 4, its thickness is in the order of 50 μm.

A few specific examples of optical fiber structures in conformity with the present invention are provided hereafter. Examples 1 to 8 concern fibers intended to operate at 1.55 μm, and example 9 concerns fibers intended to operate at 1.3 μm.

In all these examples, the thickness of the coating 4 is 50 μm.

All the fibers obtained according to the invention and displaying the characteristics indicated in the following examples have an attenuation inferior to 0.4 dB/km and a sensitivity to microbubbles at least comparable to that of a standard fiber with an optical sheath diameter of 125 μm, a core diameter comprised between 8 and 10 μm, and a protective coating thickness equal to 50 μm.

EXAMPLE 1

In this example, an optical fiber according to the invention with a step-type profile has the following characteristics (for 1.55 μm):

$\Delta n = 0.01$
$a = 2.43$ μm
$\phi = 100$ μm

EXAMPLE 2

In this example, an optical fiber according to the invention with a step-type profile has the following characteristics (for 1.55 μm):

$\Delta n = 0.01$
$a = 2.60$ μm
$\phi = 90$ μm

EXAMPLE 3

In this example, an optical fiber according to the invention with a step-type profile has the following characteristics (for 1.55 μm):

Δn=0.016
a=1.7 μm
φ=100 μm

EXAMPLE 4

In this example, an optical fiber according to the invention with a step-type profile has the following characteristics (for 1.55 μm):
Δn=0.015
a=1.98 μm
φ=80 μm

EXAMPLE 5

In this example, an optical fiber according to the invention with a step-type profile has the following characteristics (for 1.55 μm):
Δn=0.015
a=2.26 μm
φ=70 μm

EXAMPLE 6

In this example, an optical fiber according to the invention with a step-type profile has the following characteristics (for 1.55 μm):
Δn=0.02
a=1.47 μm
φ=80 μm

EXAMPLE 7

In this example, an optical fiber according to the invention with a step-type profile has the following characteristics (for 1.55 μm):
Δn=0.02
a=2.45 μm
φ=70 μm

EXAMPLE 8

In this example, an optical fiber according to the invention with a step-type profile has the following characteristics (for 1.55 μm):
Δn=0.02
a=2.45 μm
φ=60 μm

EXAMPLE 9

In this example, an optical fiber according to the invention with a step-type profile has the following characteristics (for 1.3 μm):
Δn=0.01
a=2.038 μm
φ=96 μm

EXAMPLE 10

In this example, an optical fiber according to the invention with a step-type profile has the following characteristics (for 1.3 μm):
Δn=0.015
a=1.426 μm
φ=96 μm

EXAMPLE 11

In this example, an optical fiber according to the invention with a step-type profile has the following characteristics (for 1.3 μm):
Δn=0.02
a=1.644 μm
φ=57.5 μm Obviously, the present invention is not limited to the embodiments described above.

In particular, the protective coating made of a synthetic material can consist of one or more layers, and its thickness does not necessarily neighbour 50 μm; this thickness is chosen according to the mechanical properties sought for the optical fiber, as well its sensitivity to curvatures and microcurvatures.

Furthermore, the invention also applies to optical fibers whose profile is of trapezoid or triangle-type. The reference parameters (a, Δn and φ) for a fiber of this type can be transposed through computation to the reference parameters of a fiber with a step-type profile, and vice versa, as there is a continuous equivalence relation between these parameters. In this case, the step-type profile is said to be equivalent to a triangle or trapezoid-type profile. Thus, the examples of profiles provided above can be transposed in a simple manner, by using this equivalence relation, to triangle or trapezoid-type profiles, i.e. the reference parameters of the triangle or trapezoid-type profiles can be derived in a direct manner.

Finally, any means can be replaced by an equivalent means without departing from the scope of the invention.

We claim:

1. A monomode optical fiber comprising an optical core for guiding light waves, surrounded by an optical sheath, the difference between the maximum refraction coefficient of said core and that of said optical sheath being indicated as Δn and the radius of said core being indicated as a, characterised in that:

$a \in [0.6a_c : 1.1a_c]$, $a_c$ being provided, in μm, by the formula:

$$a_c = \frac{2.405}{k} \times \frac{1}{\sqrt{2n_g \Delta n}},$$

where $k=2\pi/\lambda$, $\lambda$ being, in μm, the wavelength of the transmission, and where $n_g$ is the refraction coefficient of said optical sheath, equal within $10^{-3}$ to that of pure silica, Δn is greater than or equal to 0.01, and in that, φ being the diameter of said optical sheath, in μm: $\phi \in [\phi_{min} : 100]$, $\phi_{min}$ being provided, in μm, by the formula:

$$\phi_{min} = 125 \times \left( \frac{10^{-12}}{2.4 n_g K^2} \right)^{1/8} \frac{[V(0.5862 + 1.8364V^{-3/2} + 3.712V^{-6})]^{1/4}}{(1.1428 - 0.996V^{-1})\Delta n^{5/8}}$$

where $$V = \frac{2\pi a}{\lambda} \sqrt{2n_g \Delta n}.$$

2. An optical fiber according to claim 1, characterized in that it displays a step, trapezoid or triangle-type profile.

3. An optical fiber according to claim 1, characterized in that said optical sheath is surrounded by a protective coating made of a synthetic material.

4. An optical fiber according to claim 3, characterized in that said protective coating has a thickness which neighbours 50 μm.

* * * * *